United States Patent [19]
Siira

[11] Patent Number: 6,041,230
[45] Date of Patent: Mar. 21, 2000

[54] TRANSMISSION METHOD AND A CELLULAR RADIO SYSTEM

[75] Inventor: Mikko Siira, Oulu, Finland

[73] Assignee: Nokia Telecommunications Oy, Espoo, Finland

[21] Appl. No.: 08/816,520

[22] Filed: Mar. 13, 1997

[51] Int. Cl.[7] .............................. H04Q 7/20; H04B 1/38; H04M 1/00; H04S 3/17

[52] U.S. Cl. ..................... 455/422; 455/560; 455/561; 370/435; 370/477

[58] Field of Search ........................... 455/422, 424, 455/445, 560, 561; 704/503, 504, 210, 215; 370/477, 528, 433, 435; 375/93.08, 93.34

[56] References Cited

U.S. PATENT DOCUMENTS

| | | | |
|---|---|---|---|
| 4,534,023 | 8/1985 | Peck et al. ........................... | 370/58 |
| 4,813,040 | 3/1989 | Futato ................................... | 370/111 |
| 5,239,557 | 8/1993 | Dent ...................................... | 375/1 |

OTHER PUBLICATIONS

Second Edition of Data and Computer Communications by William Stallings (pp. 150–152), 1988.

*Primary Examiner*—Dwayne D. Bost
*Assistant Examiner*—Raymond B. Persino
*Attorney, Agent, or Firm*—Pillsbury Madison & Sutro Intellectual Property

[57] ABSTRACT

The invention relates to a transmission method and a cellular radio system comprising a base station and a vocoder which communicate with each other via a transmission path and which transmit a signal to each other. The vocoder receives a signal and encodes the received signal which at least partly consists of spare bits. The cellular radio system comprises a filtering means for filtering spare bits off the signal prior to transmitting the signal to the transmission path. The filtering of the spare bits makes it possible to save the transmission path capacity for other uses.

17 Claims, 6 Drawing Sheets

| OCT NUM | BIT NUMBER | | | | | | | |
|---|---|---|---|---|---|---|---|---|
| | 1 | 2 | 3 | 4 | 5 | 6 | 7 | 8 |
| 0 | 0 | 0 | 0 | 0 | 0 | 0 | 0 | 0 |
| 1 | 0 | 0 | 0 | 0 | 0 | 0 | 0 | 0 |
| 2 | 1 | C1 | C2 | C3 | C4 | C5 | C6 | C7 |
| 3 | C8 | C9 | C10 | C11 | C12 | C13 | C14 | C15 |
| 4 | 1 | D1 | D2 | D3 | D4 | D5 | D6 | D7 |
| 5 | D8 | D9 | D10 | D11 | D12 | D13 | D14 | D15 |
| 6 | 1 | D16 | D17 | D18 | D19 | D20 | D21 | D22 |
| 7 | D23 | D24 | D25 | D26 | D27 | D28 | D29 | D30 |
| 8 | 1 | D31 | D32 | D33 | D34 | D35 | D36 | D37 |
| 9 | D38 | D39 | D40 | D41 | D42 | D43 | D44 | D45 |
| 10 | 1 | D46 | D47 | D48 | D49 | D50 | D51 | D52 |
| ... | ... | ... | ... | ... | ... | ... | ... | ... |
| m | D(n-3) | D(n-2) | D(n-1) | Dn | S | S | S | S |
| m+1 | 1 | S | S | S | S | S | S | S |
| m+2 | S | S | S | S | S | S | S | S |
| m+3 | 1 | S | S | S | S | S | S | S |
| m+4 | S | S | S | S | S | S | S | S |
| ... | ... | ... | ... | ... | ... | ... | ... | ... |
| 35 | S | S | S | S | S | S | S | S |
| 36 | 1 | S | S | S | S | S | S | S |
| 37 | S | S | S | S | S | S | S | S |
| 38 | 1 | S | S | S | S | S | S | S |
| 39 | S | S | S | S | T1 | T2 | T3 | T4 |

Fig. 4 (Prior Art)

| OCT NUM | BIT NUMBER | | | | | | | |
|---|---|---|---|---|---|---|---|---|
| | 1 | 2 | 3 | 4 | 5 | 6 | 7 | 8 |
| 0 | 0 | 1 | 1 | 1 | 1 | 1 | 1 | 0 |
| 1 | P1 | P2 | P3 | P4 | P5 | P6 | P7 | P8 |
| 2 | P9 | P10 | P11 | P12 | P13 | P14 | P15 | P16 |
| 3 | P17 | P18 | C1 | C2 | C3 | C4 | C5 | C6 |
| 4 | C7 | C8 | C9 | C10 | C11 | C12 | C13 | C14 |
| 5 | C15 | D1 | D2 | D3 | D4 | D5 | D6 | D7 |
| 6 | D8 | D9 | D10 | D11 | D12 | D13 | D14 | D15 |
| 7 | D16 | D17 | D18 | D19 | D20 | D21 | D22 | D23 |
| 8 | D24 | D25 | D26 | D27 | D28 | D29 | D30 | D31 |
| 9 | D32 | D33 | D34 | D35 | D36 | D37 | D38 | D39 |
| 10 | D40 | D41 | D42 | D43 | D44 | D45 | D46 | D47 |
| 11 | D48 | D49 | D50 | D51 | D52 | D53 | D54 | D55 |
| ... | ... | ... | ... | ... | ... | ... | ... | ... |
| m | D(n-3) | D(n-2) | D(n-1) | Dn | | | | |

Fig. 5

| Description | Bit Mapping |
|---|---|
| PCM Subchannel (SC) (P1 - P3) | 000 PCM subchannel 0 ... 111 PCM subchannel 7 |
| PCM Timeslot (TS) (P4 - P8) | 00000 PCM Timeslot 0 ... 11111 PCM Timeslot 31 |
| PCM User Data Rate (DR) (P9 - P11) | 000 (8 kbit/s) 001 (16 kbit/s) 010 (32 kbit/s) 011 (64 kbit/s) 100 (128 kbit/s) 101 (256 kbit/s) 110 (512 kbit/s) 111 (1024 kbit/s) |
| PCM 2.048 Mbit/s Line Number (PCM) (P12 - P15) | 0000 2M PCM Line Number 0 ... 1111 2M PCM Line Number 15 |
| PCM CRC (PCRC) (P16 - P18) | CRC over control bits (P1 - P18) $P(x) = x^3 + x + 1$ |

Fig. 6

| Description | Bit Mapping |
|---|---|
| Frame Length (LEN) (C1 - C3) | 000 Rate Set 2 Full Rate (286 data bits) 001 Rate Set 2 Half Rate (126 data bits) 010 Rate Set 2 Quarter Rate (56 data bits) 011 Rate Set 2 Eighth Rate (22 data bits) 100 Rate Set 1 Full Rate (172 data bits) 101 Rate Set 1 Half Rate (80 data bits) 110 Rate Set 1 Quarter Rate (40 data bits) 111 Rate Set 1 Eighth Rate (16 data bits) |
| (C4 - C12) | reverse TRAU-BTS control bits forward TRAU-BTS control bits |
| TRAU CRC (TCRC) (C13 - C15) | CRC check over control bits (C1 - C12) $P(x) = x^3 + x + 1$ |

Fig. 7

TRANSMISSION METHOD AND A CELLULAR RADIO SYSTEM

FIELD OF THE INVENTION

The invention generally relates to telecommunication systems. More specifically, the invention relates to a digital cellular radio system in which only bits that are essential to the connection are transmitted. The invention further relates to a digital cellular radio system which uses a variable rate and fixed rate vocoder.

BACKGROUND

A typical cellular radio system comprises a fixed base station network in which a subscriber terminal communicates with one or more base stations. The base station forwards traffic originating from the subscriber terminal and traffic to the subscriber terminal. In addition, the cellular radio system comprises e.g. a base station controller which controls the base stations, and a mobile services switching center. Typically, the cellular radio system also comprises a vocoder encoding a signal.

The vocoder may be placed in e.g. a TRAU unit (TRAU=Transcoder/Rate Adaptor Unit). The TRAU unit is placed in e.g. the base station controller or the mobile services switching center. The TRAU unit source decodes the signal and adapts the signal transfer rate to be suitable for the transfer network such as a PSTN network (PSTN=Public Switched Telephone Network). The TRAU unit generates TRAU frames which it transmits to the base station. The vocoder encodes e.g. speech. Encoding reduces the data rate of the signal in e.g. the transmission line to the base station. The vocoder and the base station transmit and receive data packets from one another. The data packets form TRAU frames that are transmitted at intervals of e.g. 20 ms. The frames formed are for example 320 bits in length. The frames contain for example encoded speech, control information, signaling, or data.

The vocoder is used in adapting the signal transfer rate, which means that the vocoder encodes e.g. a 64 kbit/s signal from a PSTN network to a 16 kbit/s signal. The vocoder functions as either a variable rate or a fixed rate device. Adapting the transfer rate of the signal enables optimizing the traffic capacity on the transmission line. Optimizing the traffic capacity, in turn, enables capacity reduction particularly during a soft handoff in which a subscriber terminal in a cellular radio system has a simultaneous connection to more than one base stations. The TRAU unit operates as a source encoder reducing the bandwidth of the Air interface between the base station and a subscriber terminal.

A cellular radio system with e.g. a fixed rate vocoder utilizes discontinuous transmission to reduce interference and to lower the power consumption of the subscriber terminal. This method is used e.g. by the GSM system. In a discontinuous transmission mode, the speech encoder of the subscriber terminal detects silence in the speech, during which the subscriber terminal at times (in periods of 480 ms) only transmits a silence descriptor frame, i.e. a SID frame (SID=Silence Indication Detection). The SID frame is typically used for generating comfort noise at the receiving subscriber terminal. If noise at a suitable level were not generated, the receiving party would probably perceive the silence as unpleasant. In the worst case, the receiving party might think that the connection was lost. For example, in the GSM cellular radio system one 320-bit-long TRAU frame is encoded and transmitted over the air at 20 ms intervals, whereby the transmission rate will be 16 kbit/s. By contrast, the transmission rate during silence may be e.g. 667 bit/s.

During discontinuous transmission, Voice Activity Detection (VAD) is carried out in the cellular radio system. In practice, the detection is performed in the TRAU unit. In addition, the detection may be done in the subscriber terminal. During pauses in speech, the encoder shifts to DTX mode, whereby only SID frames are transmitted. The SID frames transmitted during pauses in speech contain updating information which is used for updating the aforementioned noise. The receiver uses the updating information in the generation of noise. Thus, the TRAU frames transmitted during pauses in speech typically only contain updating information which is transmitted at intervals of 480 ms. According to the prior art solution, however, the utilization factor of the capacity on e.g. the transmission path between a base station and a vocoder is not optimal, especially during pauses in speech.

A TRAU frame may vary in length considerably. Typical frame lengths include 268, 126, 56 and 22 bits. Also, typical frame lengths include 172, 80, 40 and 16 bits. The frames are furthermore transmitted at e.g. two different rates. A TRAU frame typically includes a 17-bit-long synchronization word. The synchronization word begins with 16 '0' bits and one '1' bit. According to the prior art solution, the end part of the frame in a DTX situation is filled with spare bits. As spare bits, e.g. '1' bits have been employed.

If the cellular radio system includes a variable rate vocoder, the end parts of the frames have been filled with spare bits, particularly at lower data rates. The adding of spare bits, however, takes up transmission path capacity. If the cellular radio system comprises a fixed rate vocoder, a frame transmitted in a DTX situation includes spare bits which do not contain any important information from the point of view of the user or the cellular radio system. The frame additionally contains comfort noise updating information transmitted at e.g. every 0.5 seconds. In addition, the prior art system employs a relatively long synchronization word which takes up capacity.

SUMMARY OF THE INVENTION

It is consequently an object of the present invention to implement a cellular radio system in which only bits or frames that are essential to the functions are transmitted. The transmission makes it possible to optimally maximize the transmission path capacity.

This object is achieved by a transmission method of the invention, used in a cellular radio system during discontinuous transmission when there are pauses in the transmission, which are detected, the method comprising the steps of receiving a signal and encoding the received signal which at least partly consists of spare bits, the cellular radio system comprising at least one base station and vocoder which communicate with each other via a transmission path and which transmit a signal to each other, and the method comprising the step of filtering off spare bits from the signal to be transmitted to the radio path prior to transmitting the aforementioned signal.

This object is in addition achieved by a transmission method according to the invention, used in a cellular radio system in which a signal is received which at least partly consists of spare bits, the cellular radio system comprising at least one base station and vocoder, and in which a received signal is encoded at a variable rate, the base station and the vocoder being interconnected via a transmission path and transmitting a signal to each other, the method comprising the step of filtering off spare bits from the signal to be transmitted to the radio path prior to transmitting the aforementioned signal.

The invention further relates to a cellular radio system employing discontinuous transmission during which there are pauses in the transmission, the cellular radio system comprising a detection means for detecting the pauses in the transmission, a base station and a vocoder encoding the signal, the vocoder communicating with the base station via a transmission path, and the cellular radio system receiving a signal which at least partly consists of spare bits, and the cellular radio system comprising a filtering means for filtering off spare bits from the signal prior to transmitting the signal to the transmission path.

Further still, the invention relates to a cellular radio system comprising a base station and a vocoder which are interconnected via a transmission path and which transmit a signal to each other, the vocoder receiving a signal and encoding the received signal at a variable rate, the signal at least partly consisting of spare bits, and the cellular radio system comprising a filtering means for filtering off spare bits from the signal prior to transmitting the signal to the transmission path.

The solution according to the invention provides a multitude of advantages. The solution makes it possible to increase transmission capacity of transmission lines. The solution employs a variable rate or a fixed rate vocoder. In the solution, modified traffic frames are transmitted from which spare bits are filtered off. In the cellular radio system, a packet-switched address is used whereby e.g. the base station controller does not have to use a signal switching matrix. A Frame Relay type of traffic concentrator located close to a base station or at a base station carries out various kinds of switchings for a signal and inserts an address in the TRAU frame, on the basis of which the signal is routed to the correct address.

The solution further employs a synchronization word considerably shorter than the one used in the prior art solution. According to the solution, unnecessary bits are filtered off particularly during discontinuous transmission. Furthermore, unnecessary frames are not transmitted at all. Compared to the synchronization word used in the prior art solution, a short synchronization word is used in the frames whereby capacity may further be saved. From the point of view of the base station and the vocoder, use of the traffic concentrator is transparent. The solution of the invention may be taken in use without needing to implement any complicated configurations to the existing apparatuses of the cellular radio system.

DESCRIPTION OF THE DRAWINGS

In the following, the invention will be described in closer detail with reference to the examples of the attached drawings, in which.

DESCRIPTION OF THE PREFERRED EMBODIMENTS

Figure 1:
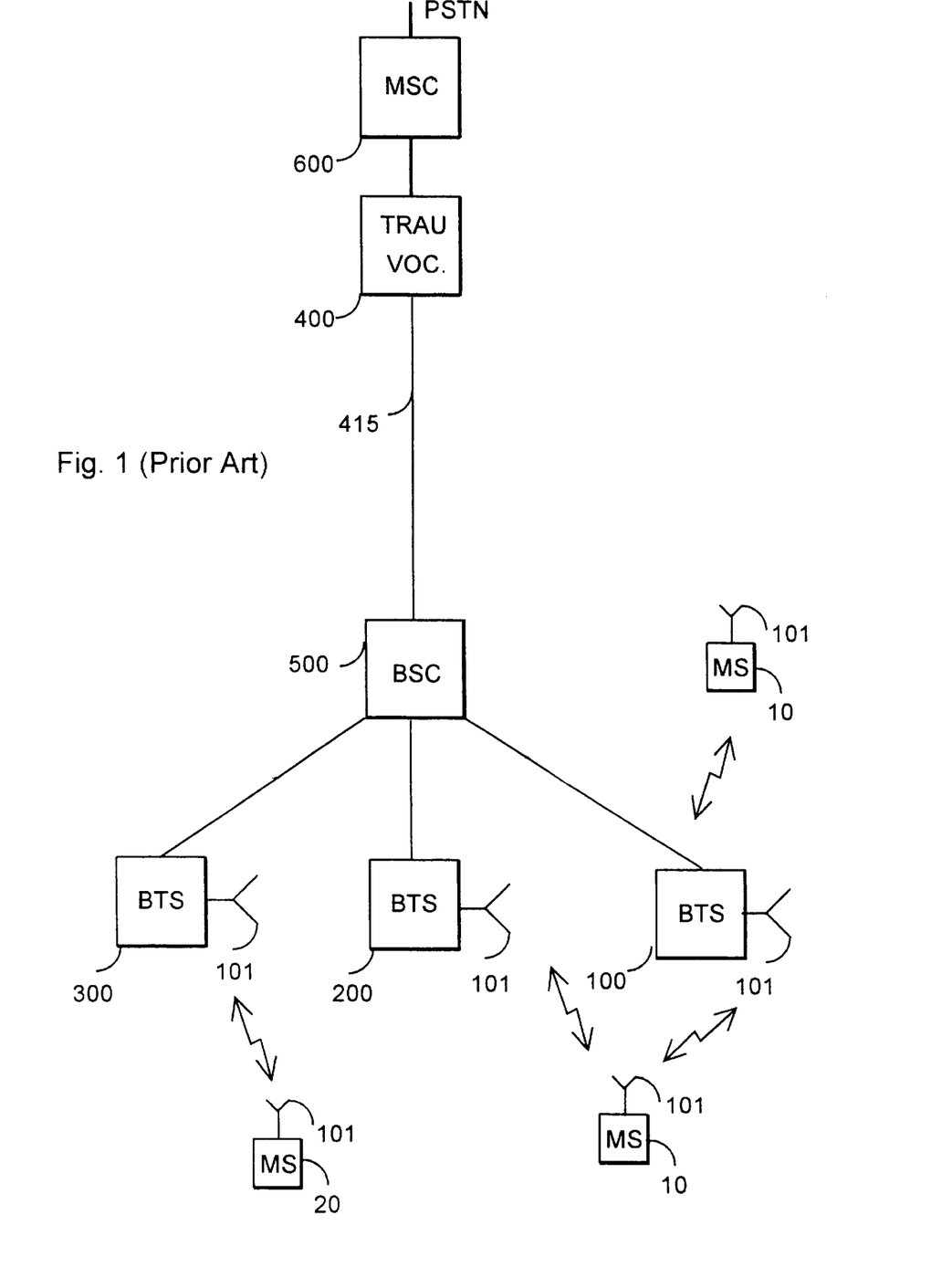
FIG. 1 illustrates a prior art cellular radio system.

FIG. 1 shows a prior art cellular radio system. The cellular radio system disclosed comprises base stations 100, 200 and 300. The cellular radio system further comprises a mobile services switching center 600, a base station controller 500 and a TRAU unit 400 serving as a vocoder. The cellular radio system further comprises a group of subscriber terminals 10, 20. The base stations and the subscriber terminals comprise an antenna 101 which serves as a transmit and receive antenna.

The vocoder 400 receives a signal, which has the rate of e.g. 64 kbit/s, arriving from the PSTN network via the mobile services switching center 600. The vocoder 400 reduces the signal rate and places the signal in TRAU frames. After this, the vocoder sends the signal it formed to the base station controller 500. After the rate reduction, the signal rate will be e.g. 16 kbit/s. In the opposite direction, the vocoder 400 receives a signal transmitted by the base stations 100, 200, 300 at the rate of 16 kbit/s, and transforms the signal rate to be again suitable for the PSTN network. During discontinuous transmission, a signal comprising various kinds of spare bits is transmitted between the vocoder 400 and the base stations 100, 200, 300. The spare bits do not contain information that is important from the point of view of the user or the operation of the system. In addition, the signal transmitted during discontinuous transmission employs a synchronization signal which takes up capacity especially in the transmission path 415 between the vocoder 400 and the base station controller 500.

Figure 2:
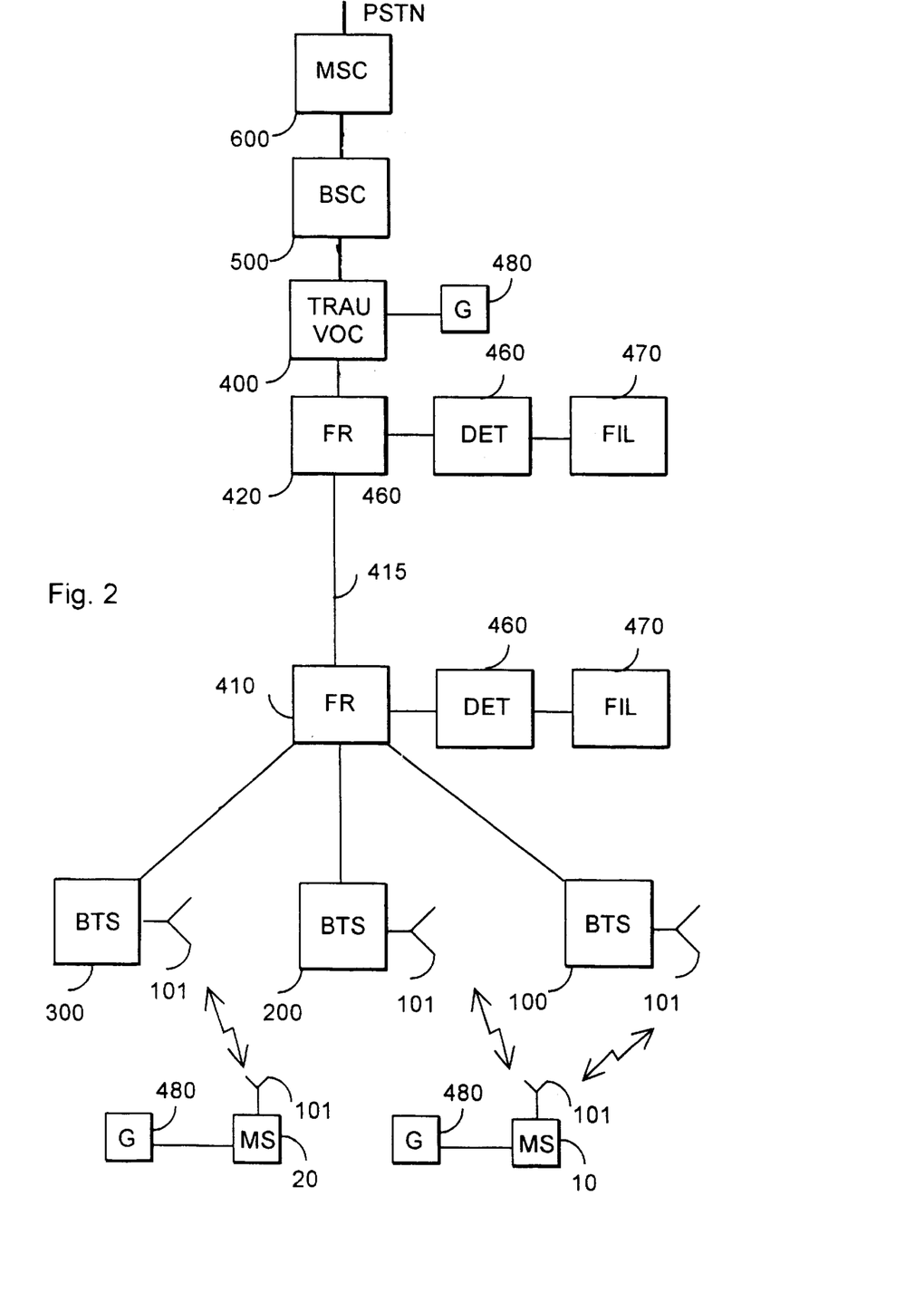
FIG. 2 shows a first embodiment of a cellular radio system in which the method according to the invention is employed.

FIG. 2 illustrates a cellular radio system which in addition to the above also comprises means 410, 420 which concentrate traffic. The means 410, 420 have been positioned between the vocoder 400 and the base stations 100, 200, 300. The means 410, 420 are interconnected via the transmission line 415. In practice, the means 410, 420 are implemented by a Frame Relay type of traffic concentrator. In the cellular radio system, the interface between the vocoder 400 and the base station 100, 200, 300 is referred to as an Abis interface. In the solution according to the invention, the capacity of the Abis interface is increased by filtering the signal prior to sending it to said interface.

The means 410 transmits to and receives basic data packets of the first frame format from the base stations 100, 200, 300. Instead, the means 420 transmits to and receives basic data packets of the first frame format from the vocoder 400. The basic data packets of the first format are e.g. TRAU frames. A TRAU frame may be e.g. a 320-bit-long frame transmitted at predetermined intervals. The means 410, 420 receive data packets of the first frame format and build concentrated data packets from them. The means 410, 420 transmit concentrated data packets to each other via the transmission path 415. The concentrated data packets transmitted by the means 410, 420 to each other are of the second frame format. In practice, the means 410, 420 operate the same way.

Figure 3:
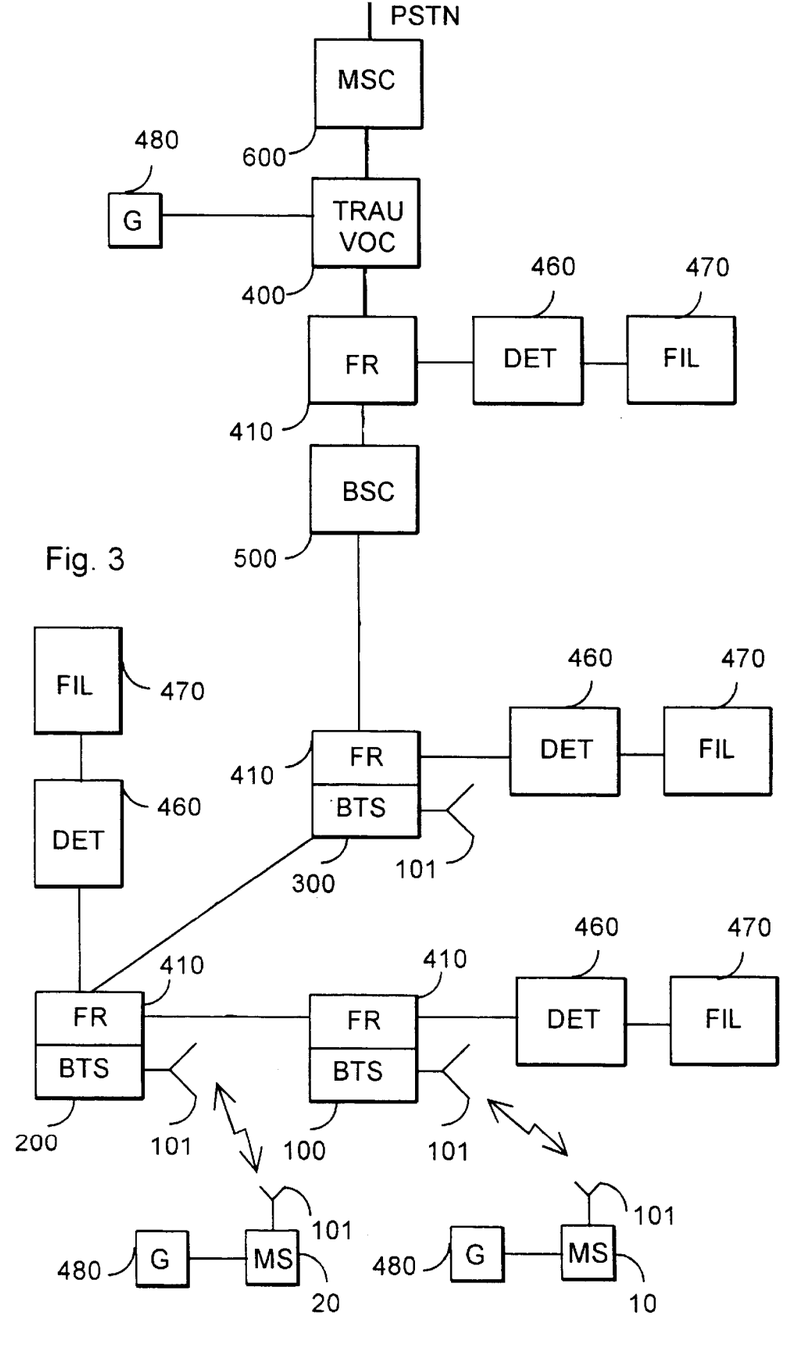
FIG. 3 shows a second embodiment of a cellular radio system in which the method according to the invention is employed.

FIG. 3 shows a cellular radio system comprising base stations 100, 200, 300. In the cellular radio system, the means 410 is placed between the vocoder 400 and the base station controller 500. In the solution according to the figure, the means has additionally been placed at every base station 100, 200, 300. The base stations are configured in a chain so that if the vocoder 400 transmits a signal in the forward direction to e.g. the base station 100, the signal travels to the base station 100 via base stations 300 and 200.

Figure 4:
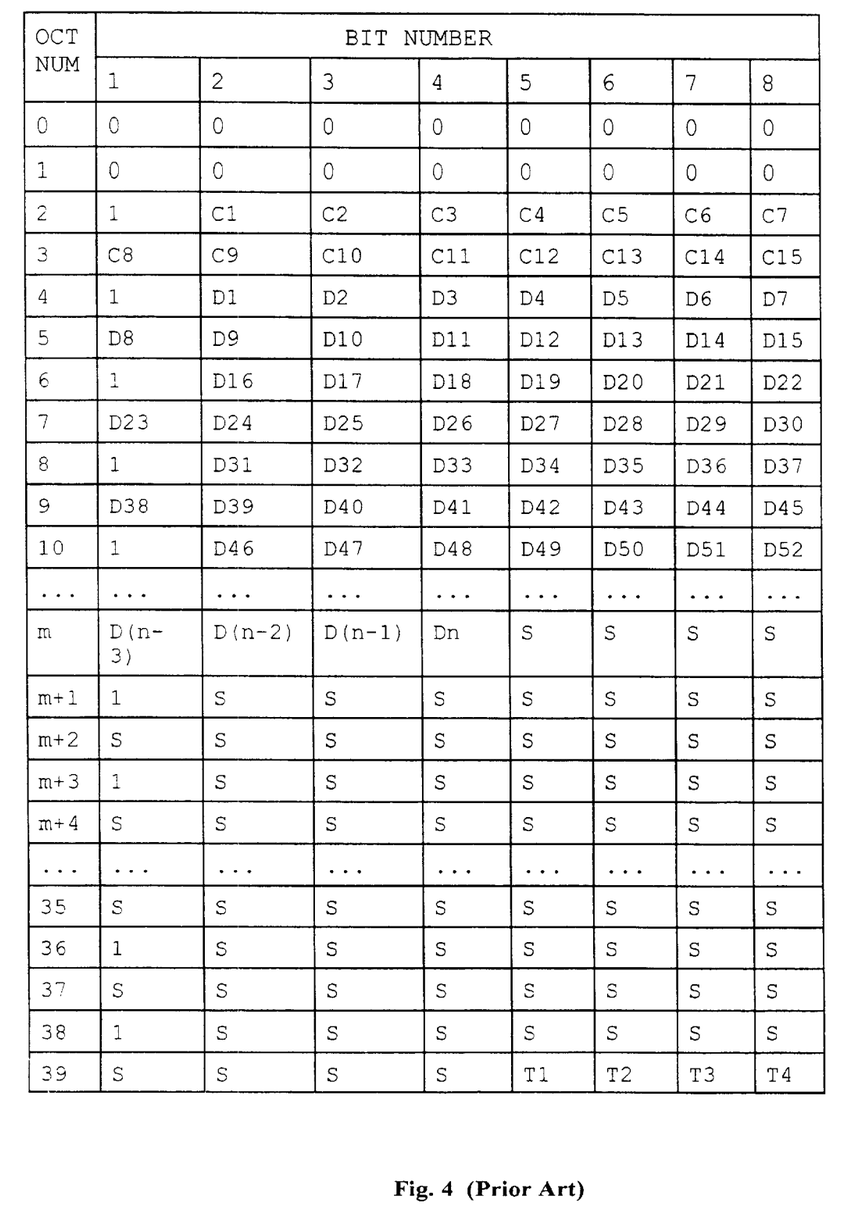
FIG. 4 illustrates the frame structure for a data packet of a first frame format.

FIG. 4 shows a table with an example of the frame structure for a data packet of the first frame format. The frame structure comprises 8-bit-long words, i.e. octets, that are numbered 0–39. The vocoder 400 generates data packets at different rates, e.g. at FS and HS rates (FS=Full Speed, HS=Half Speed). In case the vocoder 400 works at the FS rate, the rate of the generated signal will be e.g. 13 kbit/s. In case the vocoder 400 works at the HS rate, the rate of the generated signal will be e.g. 5.6 kbit/s. The vocoder encodes and decodes a signal that has at an earlier stage been encoded by e.g. PCM technique. The frame structure illustrated in the figure has been established with the vocoder operating at the FS rate. Words 0–1 of the frame structure consist of '0' bits. The words 0–1 and the first bit of words 2, 4, 6, 8 . . . 38 are used for synchronization. The frame has 320 bits in all. If the frame is transmitted at every 20 ms, the signal rate will be 16 kbit/s. The frame additionally comprises C, D and T bits. The C bits are used as control bits, the data is inserted in the D bits, and the S (spare) bits are spare bits.

Figure 5:
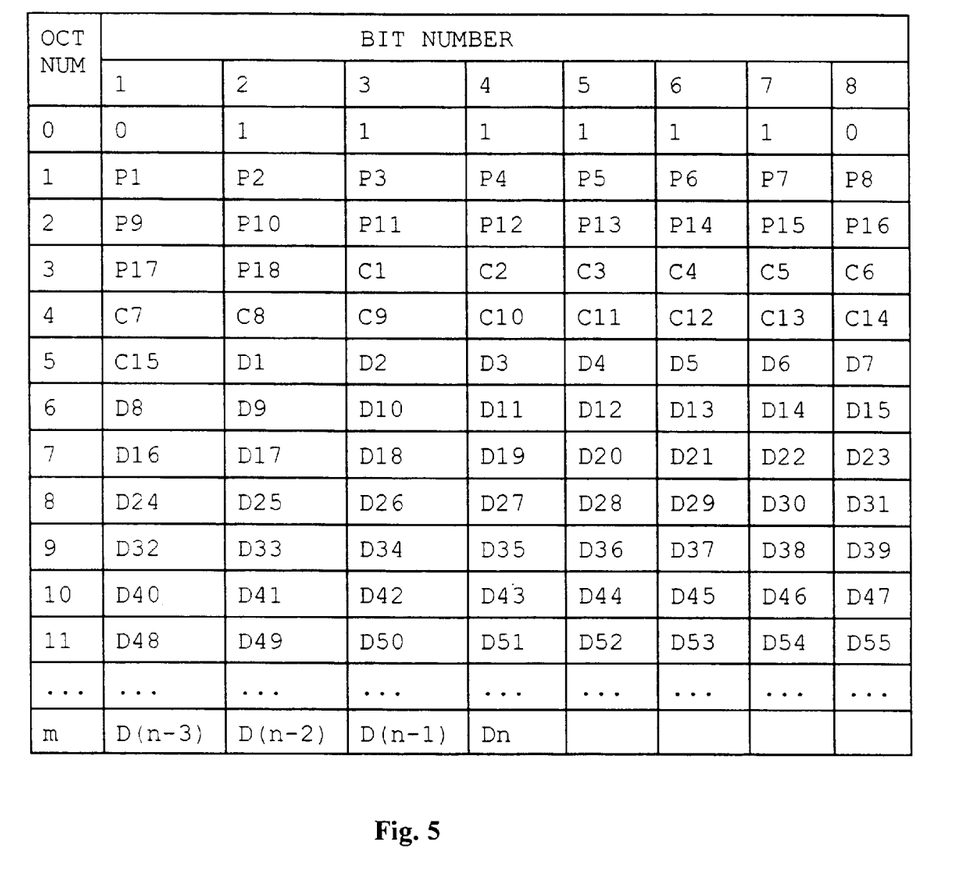
FIG. 5 illustrates the frame structure for a data packet of a second frame format.

The table of FIG. 5 illustrates the frame structure for a data packet of the second frame format. The frame structure comprises 8-bit-long words that have been numbered 0 . . . m. The frame structure of the second frame format utilizes e.g. a structure according to the HDLC protocol (HDLC= High level Data Link Control protocol). Word 0 contains a HDLC start word consisting of a hexadecimal word 0x7E. The frame structure further contains different kinds of information fields consisting of bits P, C and D. Word 1 begins an 18-bit-long stream of P bits. The P bits are used to control the routing of the PCM signal to the correct location. By utilizing three P bits, P16–P18, CRC calculation is performed for the signal. The CRC calculation is easily performed in practice. As the bit error ratios on the transmission lines are usually in the range $10^{-6}$–$10^{-9}$, a 3 bit CRC check is adequate. In the CRC calculation, also the data packet address bits, i.e. P bits, are utilized. For example, the following polynomial is used in the CRC calculation.

$$P(x)=x^3+x+1$$

There are 15 C bits, and they are used for controlling the TRAU frame. The data to be transferred on the transmission lines is inserted in the D bits.

Figure 6:
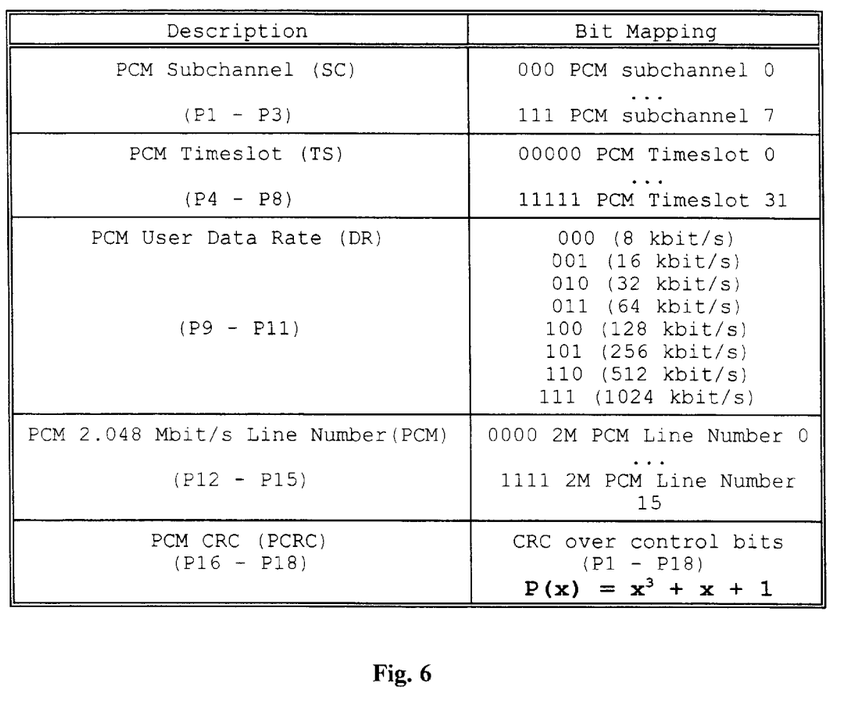
FIG. 6 illustrates the purpose of use for the P bits in the second frame format.

FIG. 6 illustrates a table which more precisely demonstrates the purpose of use of the P bits. By means of bits P1–P3, the PCM signal sub-channel is detected. Bits P4–P8 determine the time slot to be used by the PCM signal. By means of bits P9–P11, the data rate to be employed is set. By means of bits P12–P15, the signal is applied to the correct PCM line. Bits P16–P18 are used in association with CRC calculation.

Figure 7:
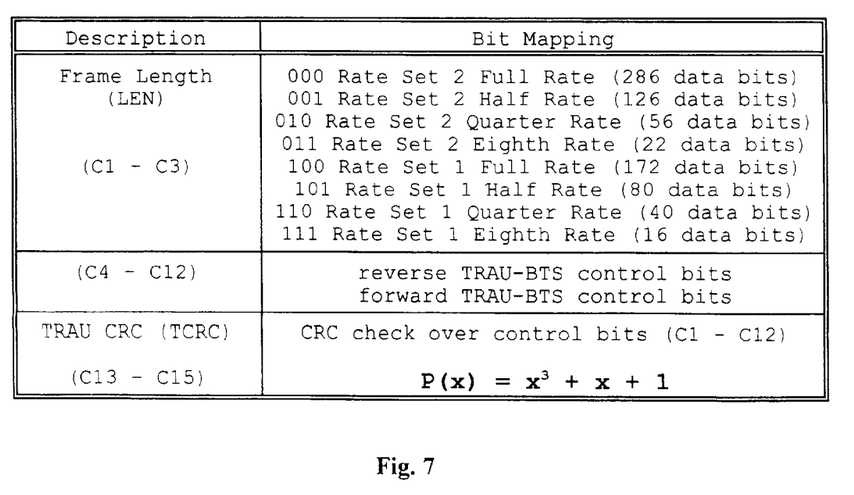
FIG. 7 illustrates the purpose of use for the C bits in the second frame format.

In FIG. 7, a table is shown which illustrates the purpose of use for the C bits in more detail. Bits C1–C3 are used to set the frame length. Changing the frame length makes it possible to employ different data rates. Bits C4–C12 are used as control bits of the reverse and forward directions. Bits C13–C15 are used in association with CRC calculation.

In a cellular radio system, a subscriber terminal and a base station establish a connection from time to time. The subscriber terminal may communicate with more than one base stations simultaneously. However, the subscriber terminal does not transmit data to the radio path continuously during the connection, but there are pauses in the transmission. The cellular radio system comprises a detection means 460 for detecting the pauses in the transmission. The cellular radio system further comprises a filtering means 470 for filtering the signal. As the means 410, 420 are receiving a signal and the detection means 460 detects a pause in the transmission, the filtering means 470 filters the signal received by the means 410, 420. At least during discontinuous transmission, the filtering means 470 filters spare bits and synchronization bits off the signal. After the filtering, the frame structure will be of e.g. the type illustrated by the table of FIG. 5. The table clearly shows that spare bits (S bits) have been filtered off. After the filtering, the signal is transmitted to the transmission path. If the means 410, 420 receive a signal that consists merely of spare bits, the filtering means 470 prevents transmission of such a signal. The filtering means 470 filters at least spare bits off the signal received. In addition, the filtering means filter off the synchronization bits in octet 0, 1 and in octets 2, 4, 6 . . . when the HDLC format is in use.

The cellular radio system further comprises a means 480 which generates noise to the subscriber terminal 10, 20 during pauses. The means 480 is additionally arranged to generate and transmit SID frames which the means 480 uses in generating noise. In the DTX mode, only SID frame updating information is transmitted to the Abis interface. The means 480 is located at the vocoder 400 and the subscriber terminal 10, 20. The filtering means 470 transmits the signals it has filtered advantageously in a modified HDLC format. In the modified HDLC format, a synchronization word is used which is only 8 bits long. The synchronization word is therefore considerably shorter than the prior art synchronization word. The filtering means 470 also adds control fields to the frame, which are used for controlling the HDLC signal.

The filtering means 470 adds a HDLC start word to the beginning of the frame, said start word being used in the synchronization of the signal. The HDLC start word at the same time signifies an end word of the previous frame. The solution of the invention utilizes a synchronization word only 8 bits long. A short synchronization word saves the transmission capacity of the cellular radio system. Furthermore, an address field, consisting of bits, is added to the frames of the filtered signal. On the basis of the address field, the signal is routed forward. The filtering means 470 calculates a CRC block check from the bits of the address field. The CRC block check makes it possible to check that the bits in the address field are free from errors.

During DTX mode in the cellular radio system, a signal is transmitted which contains spare bits that do not contain any important information from the point of view of the network or the user. In the signal, e.g. long streams of 0 bits may be transmitted, consuming the transmission path capacity. In the cellular radio system according to the invention, the filtering means at least breaks all data bit streams consisting of more than five '1' bits by inserting at least one '0' bit in said bit stream.

The means 420 transmits a signal of the second frame format it has formed to the means 410. The means 410 first receives a HDLC start message, after which the means receives data. Then, the filtering means 470 filters spare '0' bits off from long streams of '1' bits. The means 410 forms a first format frame structure by decoding the CRC information of the signal, and by adding spare bits and a synchronization word to the signal. Furthermore, the filtering means 470 filters the data address information from the concentrated data packets of the second frame format. The filtering means transmits the data packet of the first frame format formed to the PCM transmission line indicated by the address information. In addition, on the basis of the address information, the filtering means 470 inserts the data packet into the correct time slot.

The filtering means 470 may also carry out CRC calculation by employing 12 C bits (C1–C12) in the calculation.

On the basis of the calculation result, possible errors in the control bits are detected. CRC encoding and decoding may be implemented in a similar manner at the base station and the vocoder 400 due to the same polynomial being used in the calculation of the CRC bits.

Although the invention is in the above described with reference to the example of the accompanying drawings, it is obvious that the invention is not restricted thereto, but it may be modified within the inventive idea of the attached claims.

I claim:

1. A transmission method used in a cellular radio system during discontinuous transmission when there are pauses in the transmission, which are detected, the cellular radio system comprising at least one base station and vocoder which communicate with each other via a transmission path and which transmit a signal to each other, the method comprising:

receiving a signal;

encoding the received signal which at least partly consists of spare bits; and filtering off spare bits from the signal to be transmitted to the transmission path prior to transmitting the signal, wherein a signal is transmitted that comprises only non-spare bits.

2. A transmission method used in a cellular radio system in which a signal is received which at least partly consists of spare bits, the cellular radio system comprising at least one base station and vocoder, and in which a received signal is encoded at a variable rate, the base station and the vocoder being interconnected via a transmission path and transmitting a signal to each other, the method comprising:

filtering off spare bits from the signal prior to transmitting the signal to the transmission path, wherein a signal is transmitted that comprises only non-spare bits.

3. A method as claimed in claims 1 or 2, wherein a signal is received which comprises synchronization bits, and wherein transmission path capacity is optimized by filtering off synchronization bits as need be prior to transmitting the signal.

4. A method as claimed in claims 1 or 2, wherein the filtered signal is transmitted in a modified HDLC format.

5. A method as claimed in claims 1 or 2, wherein the filtered signal is transmitted in frames and wherein an address field is added to the frames of the filtered signal, said address field consisting of bits and being employed for routing the signal after receiving the signal.

6. A method as claimed in claims 1 or 2, wherein the filtered signal is transmitted in frames to which an address field is added whose correctness is checked.

7. A method as claimed in claims 1 or 2, wherein the filtered signal is transmitted in a modified HDLC format in which at least all '1' bit streams more than five bits long in the signal are broken by inserting at least one '0' bit to the bit stream.

8. A method as claimed in claims 1 or 2, wherein the filtered signal is packed and transmitted to the transmission path, after which the signal is unpacked, and wherein the signal packing and unpacking are carried out separate from the base station and the vocoder.

9. A method as claimed in claim 1, wherein the signal is encoded at a fixed rate and wherein transmission of the signal is prevented if the signal received during pauses contains spare bits only.

10. A cellular radio system employing discontinuous transmission during which there are pauses in the transmission, the cellular radio system comprising:

detection means for detecting the pauses in the transmission, a base station;

a vocoder encoding the signal, the vocoder communicating with the base station via a transmission path, and the cellular radio system receiving a signal which at least partly consists of spare bits; and filtering means for filtering off spare bits from the signal prior to transmitting the signal to the transmission path, wherein a signal is transmitted that comprises only non-spare bits.

11. A cellular radio system comprising:

a base station; and a vocoder which are interconnected via a transmission path and which transmit a signal to each other, the vocoder receiving a signal and encoding the received signal at a variable rate, the signal at least partly consisting of spare bits; and filtering means for filtering off spare bits from the signal prior to transmitting the signal to the transmission path, wherein a signal is transmitted that comprises only non-spare bits.

12. A cellular radio system as claimed in claims 10 or 11, wherein the filtering means transmits the signals it has filtered in a modified HDLC format, and wherein a signal is received which comprises synchronization bits, and wherein the filtering means optimize the transmission path capacity by filtering off synchronization bits as need be prior to transmitting the signal.

13. A cellular radio system as claimed in claims 10 or 11, wherein the filtering means transmits the signals it has filtered in a modified HDLC or similar format, and wherein the filtering means adds control fields to the signal, which are utilized in controlling the HDLC signal.

14. A cellular radio system as claimed in claims 10 or 11, wherein the filtering means transmits the signals it has filtered in frames to which the filtering means adds an address field consisting of bits, the address field being used in routing the filtered signal forward.

15. A cellular radio system as claimed in claims 10 or 11, wherein the filtering means transmits the signal it has filtered in frames to which the filtering means adds an address field consisting of bits, the address field being used by the filtering means to form a CRC block check which is employed in checking the correctness of the bits in the address field.

16. A cellular radio system as claimed in claims 10 or 11, wherein the filtering means transmits the signal it has filtered in a modified HDLC format, wherein the filtering means at least breaks all bit streams of '1' bit more than five bits long in the signal by inserting at least one '0' bit into the bit stream that was broken.

17. A cellular radio system as claimed in claim 10, wherein the vocoder encodes a signal at a fixed rate, and wherein the filtering means prevents the transmission of the filtered signal if the signal formed during pauses consists of spare bits only.

* * * * *